US012562100B2

(12) United States Patent
Hong et al.

(10) Patent No.: US 12,562,100 B2
(45) Date of Patent: Feb. 24, 2026

(54) LIGHT EMITTING DISPLAY APPARATUS

(71) Applicant: LG Display Co., Ltd., Seoul (KR)

(72) Inventors: MooKyoung Hong, Paju-si (KR); SunYoung Hwang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 50 days.

(21) Appl. No.: 18/383,359

(22) Filed: Oct. 24, 2023

(65) Prior Publication Data

US 2024/0221616 A1 Jul. 4, 2024

(30) Foreign Application Priority Data

Dec. 29, 2022 (KR) ........................ 10-2022-0189167

(51) Int. Cl.
*G09G 3/32* (2016.01)

(52) U.S. Cl.
CPC ....... *G09G 3/32* (2013.01); *G09G 2300/0828* (2013.01); *G09G 2310/0267* (2013.01); *G09G 2310/0275* (2013.01); *G09G 2330/021* (2013.01)

(58) Field of Classification Search
CPC ... G09G 2300/0828; G09G 2310/0267; G09G 2310/0275; G09G 2330/021; G09G 3/32; G09G 3/3233
See application file for complete search history.

(56) References Cited

U.S. PATENT DOCUMENTS

| | | | | |
|---|---|---|---|---|
| 2009/0027377 | A1* | 1/2009 | Kwon | G09G 3/3233 345/214 |
| 2014/0376682 | A1* | 12/2014 | Jang | G11C 19/28 377/64 |
| 2019/0279585 | A1* | 9/2019 | Suzuki | G09G 3/20 |
| 2020/0333391 | A1* | 10/2020 | Park | G01R 31/56 |
| 2021/0201816 | A1* | 7/2021 | Kim | G09G 3/3266 |
| 2021/0216322 | A1* | 7/2021 | Lu | G06F 9/3836 |
| 2021/0383769 | A1 | 12/2021 | Lee et al. | |
| 2022/0157223 | A1 | 5/2022 | Wang et al. | |
| 2022/0208081 | A1* | 6/2022 | Kim | G11C 19/28 |
| 2022/0335878 | A1 | 10/2022 | Song et al. | |

FOREIGN PATENT DOCUMENTS

| | | |
|---|---|---|
| CN | 109891313 A | 6/2019 |
| CN | 110415639 A | 11/2019 |
| KR | 10-1271525 B1 | 6/2013 |
| TW | 202127241 A | 7/2021 |

* cited by examiner

*Primary Examiner* — Kenneth Bukowski
(74) *Attorney, Agent, or Firm* — Birch, Stewart, Kolasch & Birch, LLP

(57) ABSTRACT

A light emitting display apparatus can include a panel including a gate driver configured to output gate pulses and pixels configured to display an image; a power supply configured to supply a stage driving voltage to the gate driver and adjust a level of the stage driving voltage based on a dummy stage sensing signal received from the gate driver; and a data driver configured to supply data voltages to the pixels and generate a determination signal related to an occurrence of an abnormality in the gate driver based on a monitoring signal received from the power supply. Also, the light emitting display apparatus can further include a control driver configured to receive the determination signal from the data driver and control the power supply to adjust the level of the stage driving voltage based on a lookup table.

20 Claims, 9 Drawing Sheets

LIGHT EMITTING DISPLAY APPARATUS

CROSS-REFERENCE TO RELATED APPLICATIONS

This application claims priority to the Korean Patent Application No. 10-2022-0189167 filed in the Republic of Korea, on Dec. 29, 2022, the entirety of which is hereby incorporated by reference into the present application as if fully set forth herein.

BACKGROUND

Field of the Invention

The present disclosure relates to a light emitting display apparatus.

Discussion of the Related Art

A light emitting display apparatus is mounted on or in electronic products, such as televisions, monitors, notebook computers, smart phones, tablet computers, electronic pads, wearable devices, watch phones, portable information devices, navigation devices, or vehicle control display apparatus to perform a function of displaying images.

When a light emitting display apparatus is used for an extended period of time, transistors included in the light emitting display apparatus can become degraded. If the transistors are degraded, threshold voltages of the transistors can start to vary considerably. Therefore, the transistors may not operate normally by conventionally supplied power. Also, the light emitting display apparatus can consume a large amount of power and its lifespan can be shorter than desired. Thus, there exists a need for a light emitting display apparatus that has a longer lifespan, improved image quality and reduced power consumption.

SUMMARY OF THE DISCLOSURE

A gate driver which supplies gate pulses to gate lines is provided in a display panel configuring a light emitting display apparatus, and transistors are provided in the gate driver. For driving the transistors, a stage driving voltage is supplied to the gate driver. In order to determine whether the gate driver is being driven normally by the stage driving voltage, a quality of the gate driver can be tested during the manufacturing process of the light emitting display apparatus. According to the test result, a level of the stage driving voltage supplied to the gate driver can be set.

When the light emitting display apparatus is used by the user for an extended period of time, transistors of the gate driver are degraded. However, after the light emitting display apparatus is used by the user, the degree of degradation of the transistors of the gate driver cannot be determined, so the existing stage driving voltage is continuously supplied to the gate driver, even though different transistors within the device have different voltage thresholds and different needs. Accordingly, the gate driver may not operate normally.

Therefore, a light emitting display apparatus which can continuously monitor the degree of degradation of a transistor provided in a gate driver and change a level of a stage driving voltage based on the result is invented.

Accordingly, the present disclosure is directed to providing a light emitting display apparatus that substantially obviates one or more problems due to limitations and disadvantages of the related art.

An aspect of the present disclosure is directed to providing a light emitting display apparatus which can continuously monitor the degree of degradation of a transistor provided in a gate driver and change a level of a stage driving voltage based on the result.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a panel in which a gate driver outputting gate pulses is provided, a power supply which supplies a stage driving voltage to the gate driver and changes a level of the stage driving voltage by using a dummy stage sensing signal transmitted from the gate driver, a data driver which supplies data voltages to pixels provided in a display area of the panel and generates a determination signal related to an occurrence of an abnormality in the gate driver by using a monitoring signal transmitted from the power supply, and a control driver which controls the power supply so that the power supply changes a level of the stage driving voltage based on a lookup table when it is determined that a problem occurs in the gate driver as a result of analyzing the determination signal.

It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
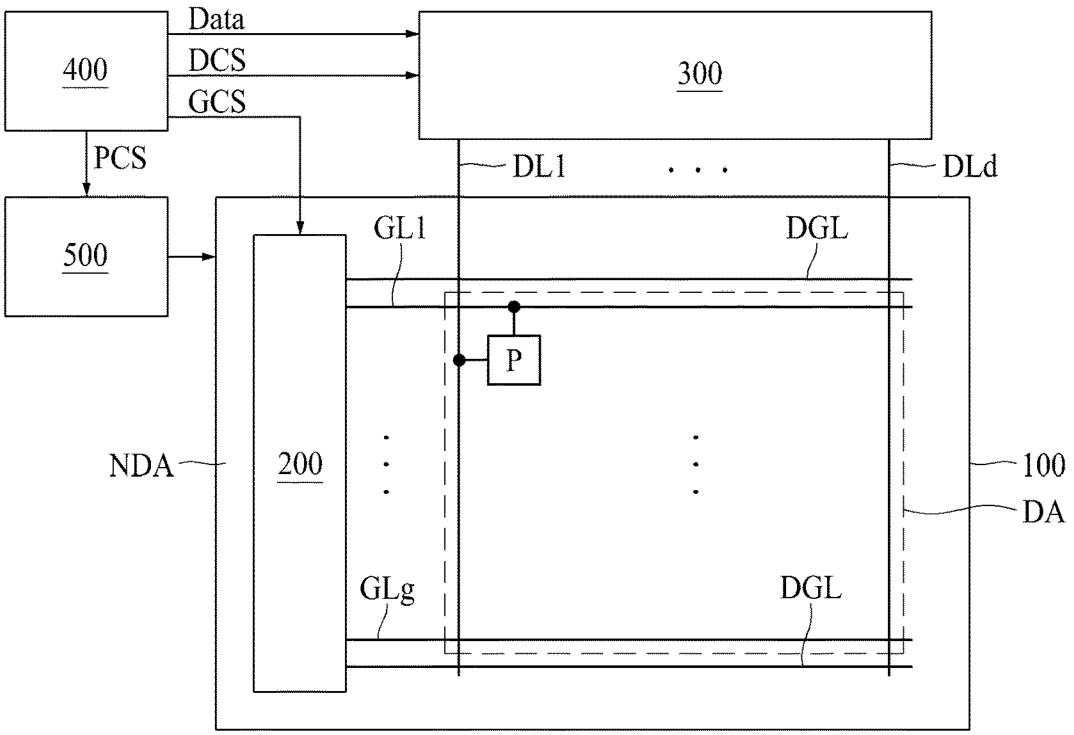
FIG. 1 is an example diagram illustrating a configuration of a light emitting display apparatus according to an embodiment of the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a situation that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
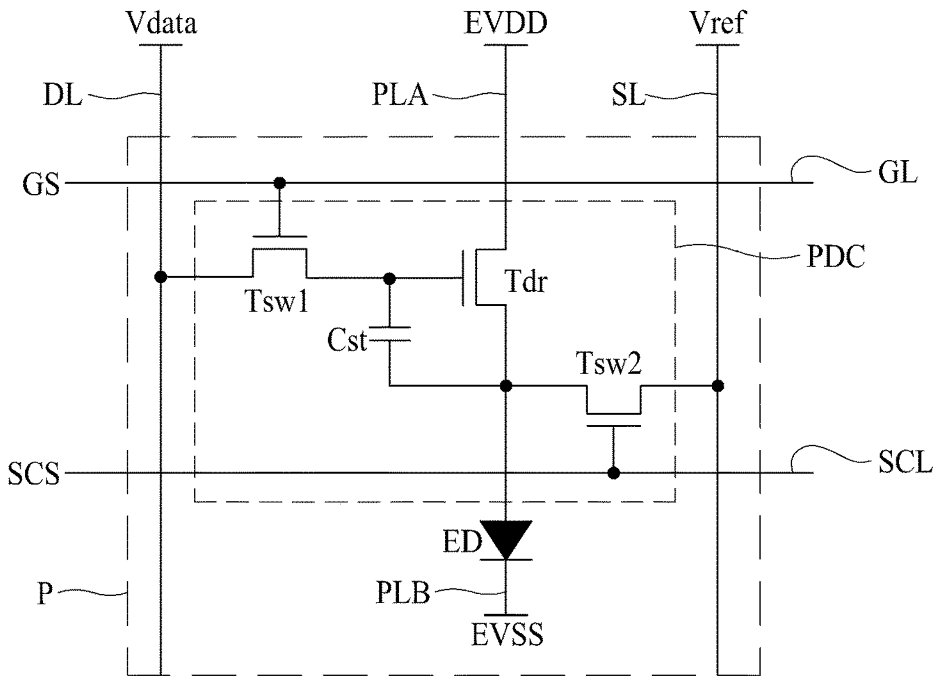
FIG. 2 is an example diagram illustrating a structure of a pixel applied to a light emitting display apparatus according to an embodiment of the present disclosure.
Figure 3:
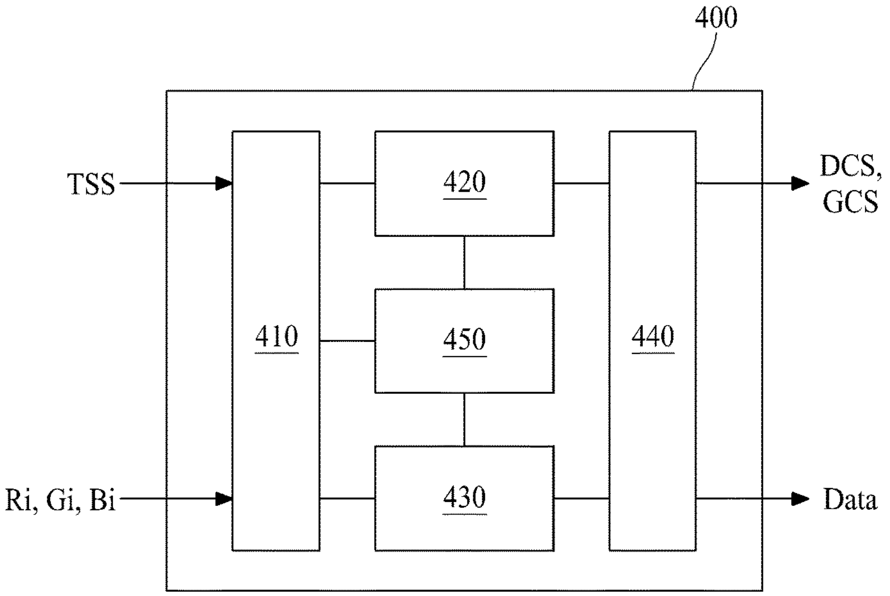
FIG. 3 is an example diagram illustrating a structure of a control driver applied to a light emitting display apparatus according to an embodiment of the present disclosure.
Figure 4:
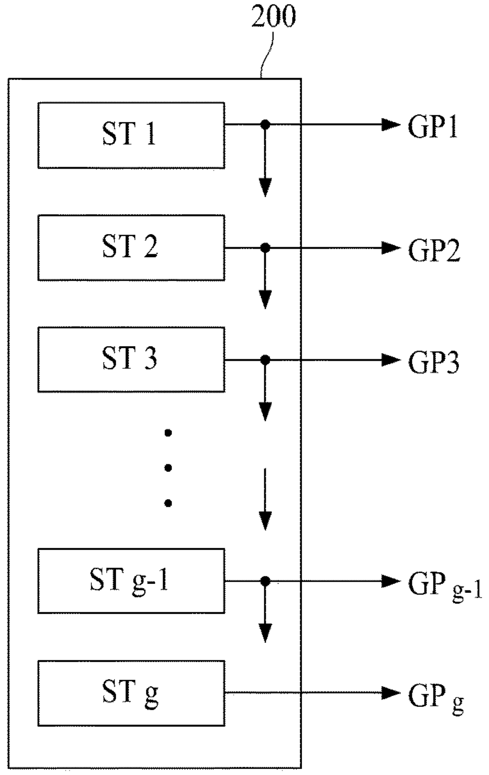
FIG. 4 is an example diagram illustrating a structure of a gate driver applied to a light emitting display apparatus according to an embodiment of the present disclosure.
Figure 5:
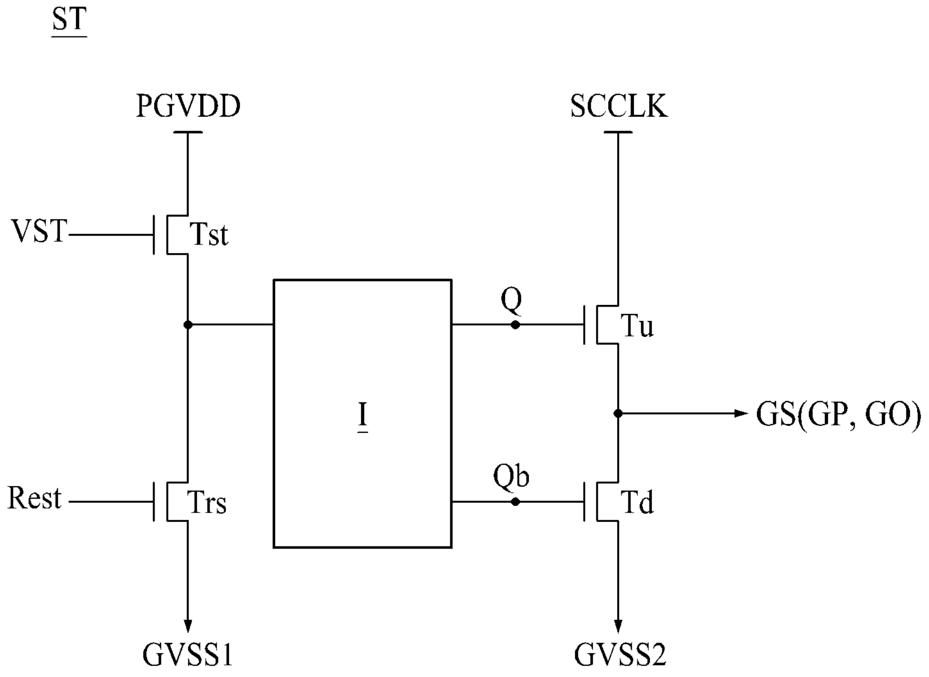
FIG. 5 is an example diagram schematically illustrating a structure of a stage illustrated in FIG. 4.
Figure 6A:
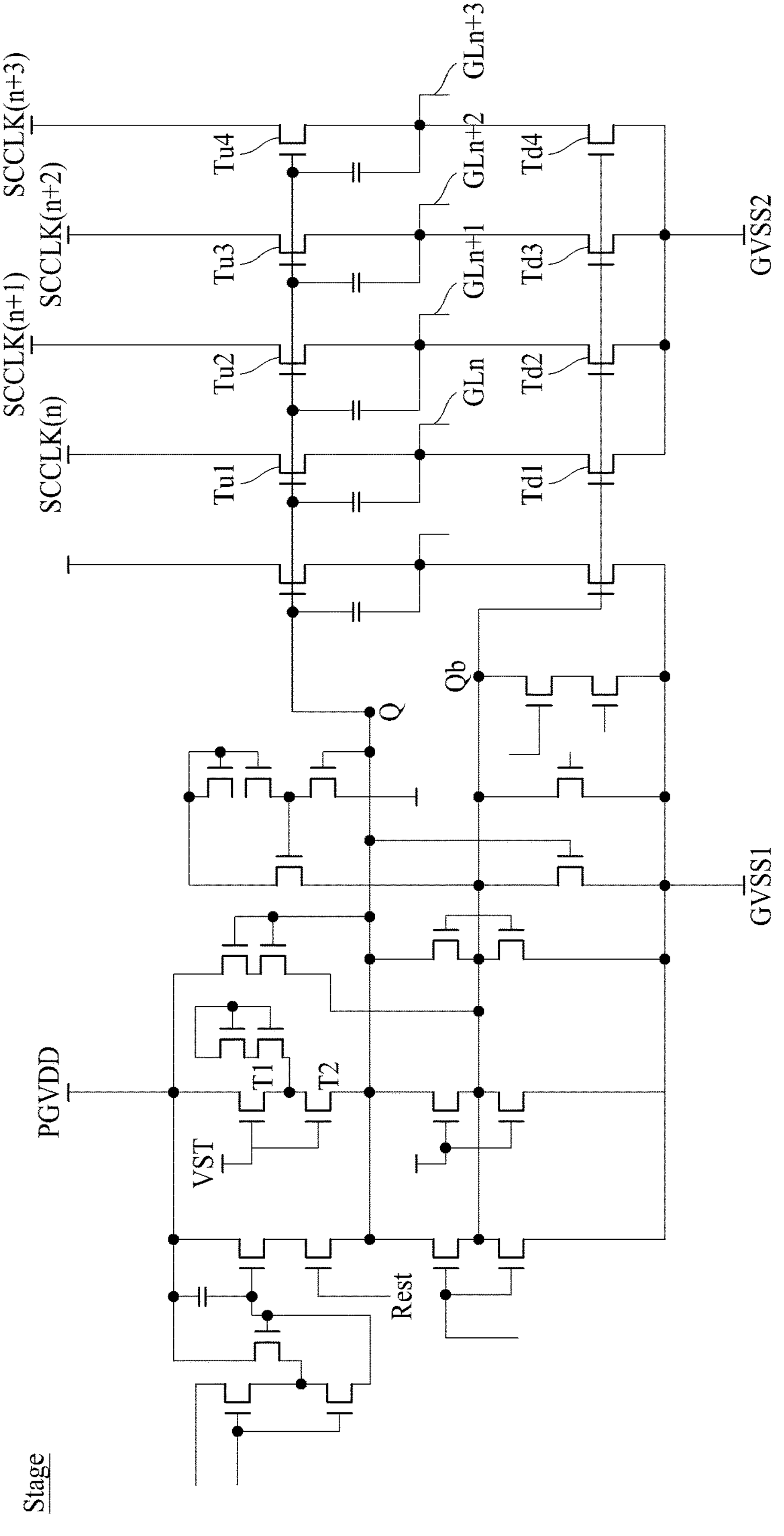
FIG. 6A is an example diagram illustrating a structure of a stage illustrated in FIG. 4 according to an embodiment of the present disclosure.
Figure 6B:
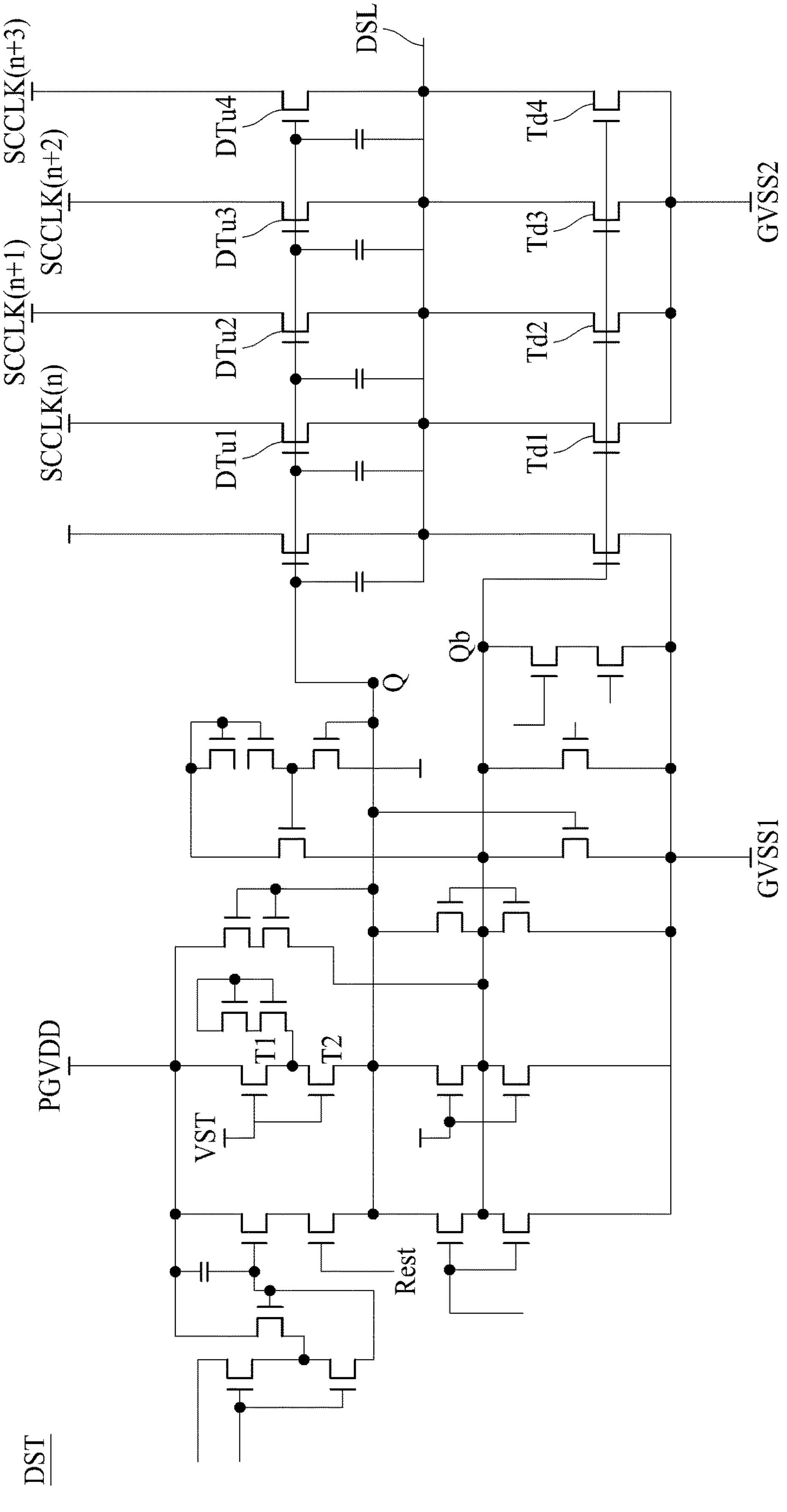
FIG. 6B is an example diagram illustrating a structure of a dummy stage included in a gate driver illustrated in FIG. 4 according to an embodiment of the present disclosure.
Figure 7:
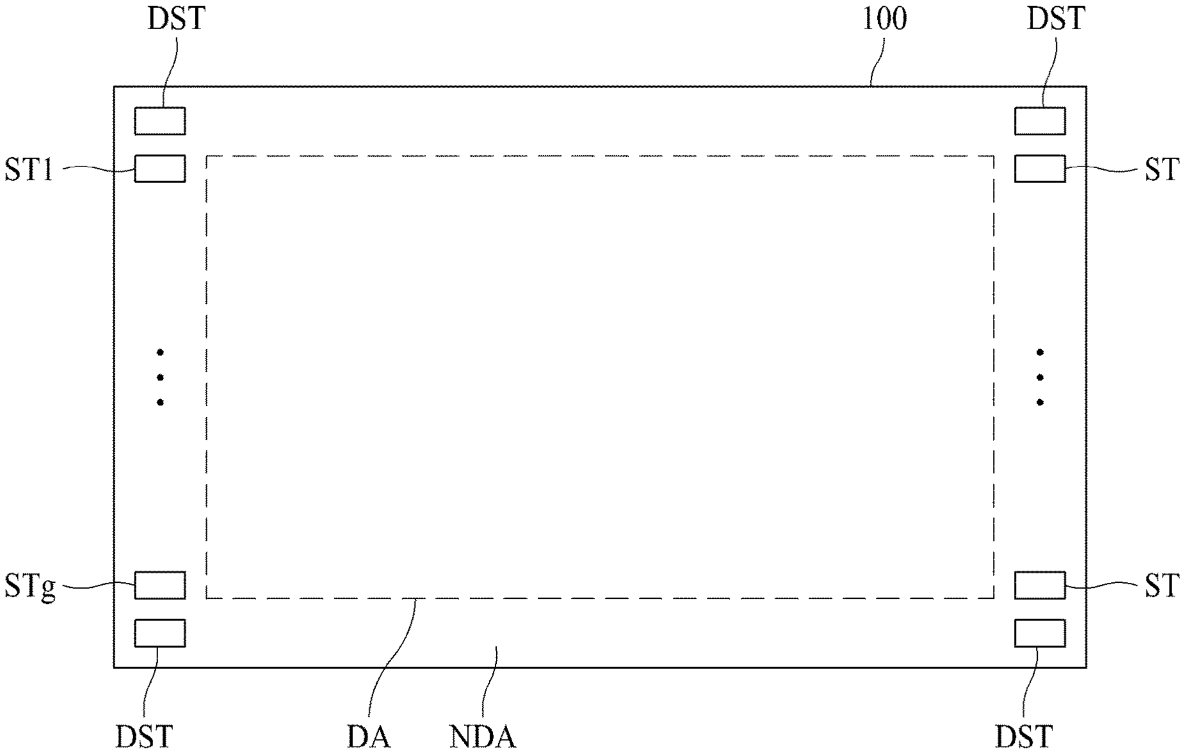
FIG. 7 is an example diagram illustrating a position of a dummy stage in a light emitting display panel applied to a light emitting display apparatus according to an embodiment of the present disclosure.

FIG. 1 is an example diagram illustrating a configuration of a light emitting display apparatus according to an embodiment of the present disclosure, FIG. 2 is an example diagram illustrating a structure of a pixel applied to a light emitting display apparatus according to an embodiment of the present disclosure, FIG. 3 is an example diagram illustrating a structure of a control driver applied to a light emitting display apparatus according to an embodiment of the present disclosure, FIG. 4 is an example diagram illustrating a structure of a gate driver applied to a light emitting display apparatus according to an embodiment of the present disclosure, FIG. 5 is an example diagram schematically illustrating a structure of a stage illustrated in FIG. 4, FIG. 6A is an example diagram illustrating a structure of a stage illustrated in FIG. 4, FIG. 6B is an example diagram illustrating a structure of a dummy stage included in a gate driver illustrated in FIG. 4, and FIG. 7 is an example diagram illustrating a position of a dummy stage in a light emitting display panel applied to a light emitting display apparatus according to an embodiment of the present disclosure.

The display apparatus according to the present disclosure can configure various electronic devices. The electronic devices can include, for example, smartphones, tablet personal computers (PCs), televisions (TVs), digital signage and monitors, but embodiments are not limited thereto.

The light emitting display apparatus according to an embodiment of the present disclosure, as illustrated in FIG. 1, can include a display panel 100 which includes a display area DA displaying an image and a non-display area NDA provided outside the display area DA, a gate driver 200 which supplies gate signals to a plurality of gate lines GL1 to GLg provided in the display area DA of the display panel 100, a data driver 300 which supplies data voltages Vdata to a plurality of data lines DL1 to DLd provided in the display panel 100, a control driver 400 which controls driving of the gate driver 200 and the data driver 300, and a power supply 500 which supplies power to the control driver 400, the gate driver 200, the data driver 300, and the light emitting display panel 100.

The light emitting display panel 100 includes a display area DA and a non-display area NDA. Gate lines GL1 to GLg, data lines DL1 to DLd, and pixels P are provided in the display area DA. Accordingly, an image is output in the display area DA. Here, g and d are natural numbers. The non-display area NDA surrounds the outer periphery of the display area DA.

The pixel P included in the light emitting display panel 100, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line PLA through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. A gate signal GS can include a gate pulse for turning on the switching transistor Tsw1 and a gate-off signal for turning off the switching transistor Tsw1.

The sensing transistor Tsw2 can be provided for measuring a threshold voltage or mobility of the driving transistor, or for suppling a reference voltage Vref to the pixel driving circuit PDC. A first terminal of the sensing transistor Tsw2 can be connected to a second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be selectively connected to the data driver 300 or the power supply 500 through the data driver 300. That is, the reference voltage Vref supplied from the power supply 500 can be supplied to pixels P through the sensing line SL, and data sensing signals transferred through the sensing line SL from the pixels can be processed by the data driver 300.

The light emitting device ED can include a first electrode supplied with a first voltage EVDD through the driving transistor Tdr, a second electrode connected to a second voltage supply line PLB supplied with a second voltage EVSS, and a light emitting layer provided between the first electrode and the second electrode.

A structure of the pixel P applied to the present disclosure is not limited to a structure illustrated in FIG. 2. Accordingly, a structure of the pixel P can be changed to various shapes.

The data driver 300 can supply data voltages to the data lines DL1 to DLd and can supply a reference voltage Vref to the sensing line SL. The data driver 300 can convert a data sensing signal received through the sensing line SL into a digital signal and transmits the digital signal to the control driver 400.

With reference to FIG. 4, the controller 400 can realign input image data Ri, Gi, and Bi transferred from an external system by using a timing synchronization signal TSS transferred from the external system and can generate data control signals DCS to be supplied to the data driver 300 and gate control signals GCS to be supplied to the gate driver 200.

To this end, the controller 400 can include a data aligner 430 which realigns the pieces of input image data Ri, Gi, and Bi to generate pieces of image data Data and supplies the pieces of image data Data to the data driver 300, a control signal generator 420 which generates the gate control signal GCS and the data control signal DCS by using the timing synchronization signal TSS, an input unit 410 which receives the timing synchronization signal TSS and the pieces of input image data Ri, Gi, and Bi transmitted from the external system, transfers the pieces of input image data Ri, Gi, and Bi to the data aligner 430, and transfers the timing synchronization signal TSS to the control signal generator 420, and an output unit 440 which supplies the data driver 300 with pieces of image data Data generated by the data aligner 430 and the data control signal DCS generated by the control signal generator 420 and outputs the gate control signal GCS, generated by the control signal generator 420, to the gate driver 200.

The control signal generator 420 can generate a power control signal PCS supplied to the power supply 500.

The control driver 400 can include a storage unit 450 for storing various information. The storage unit 450 can be included in the control driver 400 or can be provided separately from the control driver 400 and provided independently. Particularly, a lookup table applied to the light emitting display apparatus according to the present disclosure can be stored in the storage unit 450.

The external system can perform a function of driving the control driver 400 and an electronic device. For example, when the electronic device is a television (TV), the external system can receive various kinds of sound information, image information, and letter information over a communication network and can transmit the received image information to the control driver 400. In this situation, the image information can be the pieces of input image data Ri, Gi, and Bi.

The power supply 500 can generate various power voltages and supply the generated power voltages to the control driver 400, the gate driver 200, the data driver 300, and the light emitting display panel 100.

In the following description, the various power voltages supplied from the power supply 500 to the gate driver 200 can include a stage driving voltage.

The gate driver 200 can be directly embedded into the non-display area NDA by using a gate-in panel (GIP) type. Moreover, the gate driver 200 can be provided in the display area DA in which light emitting devices ED are provided.

When the gate driver 200 is provided in the non-display area NDA by using a gate-in panel (GIP) type, or is provided in the display area DA, transistors configuring the gate driver 200 can be provided in the non-display area NDA through the same process as transistors included in each of the pixels P of the display area DA.

The gate driver 200 can supply gate pulses GP1 to GPg to the gate lines GL1 to GLg.

When a gate pulse generated by the gate driver 200 is supplied to a gate of a switching transistor Tsw1 included in the pixel P, the switching transistor Tsw1 can be turned on. When the switching transistor is turned on, data voltage Vdata supplied through the data line can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel P any longer.

The gate signal GS supplied to the gate line GL can include the gate pulse GP and the gate-off signal.

In order to supply the gate pulses GP1 to GPg to gate lines GL1 to GLg, the gate driver 200 can include stages ST1 to STg connected to the gate lines GL1 to GLg, as illustrated in FIG. 4.

Each of the stages ST1 to STg can be connected to one gate line GL, but can also be connected to at least two gate lines GL. Hereinafter, for convenience of description, as illustrated in FIG. 4, a gate driver 200 in which each of the stages ST1 to STg is connected to one gate line GL will be described as an example of the present disclosure.

At least one of the signals output from the stage ST in which the gate pulse GP is output can be supplied to another stage ST to drive another stage ST. Accordingly, a gate pulse can be output in another stage ST.

A schematic example diagram of a stage ST performing the above-described function is illustrated in FIG. 5.

The stage ST can include a plurality of transistors. In order to describe the schematic configuration of the stage ST, a stage including four transistors Tst, Trs, Tu, and Td is illustrated in FIG. 5 as an example of the stage ST applied to the present disclosure.

The start transistor Tst can be turned on based on the start signal VST and can transfer a stage driving voltage PGVDD to a gate of a pull-up transistor Tu through a circuit unit I and Q node Q. Here, the start signal VST can be transferred from the control driver 400, or can be a signal which is transferred from a previous stage. In this situation, the previous stage can be a stage which is directly adjacent to a currently driven stage ST, or can be a stage which is separated from the currently driven stage with at least one stage therebetween.

The pull-up transistor Tu can be turned on by the stage driving voltage PGVDD to output the gate pulse GP to the gate line GL. In this situation, a gate pulse GP having a high level can be output to the gate line GL.

The stage driving voltage PGVDD passing through the start transistor Tst can be converted into a low voltage in the circuit unit I and supplied to a gate of the pull-down transistor Td through the Qb node Qb. Moreover, the first low voltage GVSS1 can be supplied to the gate of the pull-down transistor Td through the circuit unit I and the Qb node Qb. The pull-down transistor Td can be turned off by the low voltage or the first low voltage GVSS1 supplied to the gate. Accordingly, only the gate pulse GP passing through the pull-up transistor Tu can be output to the gate line GL.

When the start transistor Tst is turned off and the reset transistor Trs is turned on by the reset signal Rest, the first low voltage GVSS1 can be supplied to the pull-up transistor Tu through the reset transistor Trs and the circuit unit I, and thus the pull-up transistor Tu can be turned off.

The first low voltage GVSS1 can be converted into a high voltage by the circuit unit I and supplied to the gate of the pull-down transistor Td through the Qb node Qb. Moreover, the stage driving voltage PGVDD can be supplied to the gate of the pull-down transistor Td through the circuit unit I and the Qb node Qb. The pull-down transistor Td can be turned on by the high voltage or the stage driving voltage PGVDD supplied to the gate. When the pull-down transistor Td is turned on, the second low voltage GVSS2 can be supplied to the gate line GL through the pull-down transistor Td. The second low voltage GVSS2 can be the same voltage as the first low voltage EVSS1, or can be a different voltage than the first low voltage EVSS1.

That is, because the pull-up transistor Tu is turned off when the pull-down transistor Td is turned on, the second low voltage GVSS2 with a low level passing through the pull-down transistor Td can be output to the gate line GL. The second low voltage GVSS2 supplied to the gate line GL through the pull-down transistor Td can be a gate-off signal GO. The switching transistor Tsw1 can be turned off by the gate-off signal GO supplied to the gate of the switching transistor Tsw1.

The structure and driving method of the stage ST can be variously changed based on the structure and driving method described with reference to FIG. 5.

For example, the stage ST can be configured as illustrated in FIG. 6A. As described above, each of the stages ST can be connected to one gate line GL, but can also be connected to at least two gate lines GL. A stage connected to four gate lines GLn, GLn+1, GLn+2, and GLn+3 (n is a natural number) is illustrated in FIG. 6A as an example of the present disclosure.

As described above with reference to FIG. 5, even in the stage ST illustrated in FIG. 6A, when the start transistors T1 and T2 are turned on by the start signal VST, the stage driving voltage PGVDD can be supplied to the gates of the pull-up transistors Tu1, Tu2, Tu3, and Tu4 through the Q node Q.

The pull-up transistors Tu1, Tu2, Tu3, and Tu4 can be turned on by the stage driving voltage PGVDD to sequentially convert gate clocks SCCLK(n), SCCLK(n+1), SCCLK(n+2), and SCCLK(n+3) into gate pulses GP. The gate pulses GP can be sequentially output to the gate lines GLn, GLn+1, GLn+2, and GLn+3.

When pull-down transistors Td1, Td2, Td3, and Td4 are turned on by the high voltage or stage driving voltage PGVDD supplied to the gate, the second low voltage GVSS2 can be output to the gate lines Gn, GLn+1, GLn+2, and GLn+3. The second low voltage GVSS2 can be a gate-off signal GO.

In addition to the stages ST which output gate pulses GP, at least one dummy stage DST can be provided in the gate driver 200. The dummy stage DST can generate a dummy stage sensing signal by using the stage driving voltage PGVDD, and the dummy stage sensing signal can be transmitted to the power supply 500 through the dummy stage sensing line.

The dummy stage DST can be implemented in a type of circuit similar to the stage ST. For example, the dummy stage DST can include the same configurations as the stage ST illustrated in FIG. 6A, as illustrated in FIG. 6B, except for some differences.

The difference between the dummy stage DST and the stage ST is that in the dummy stage DST, dummy pull-up transistors DTu1, DTu2, DTu3, and DTu4 are connected to the same dummy stage sensing line DSL, as illustrated in FIG. 6B. In the stage ST illustrated in FIG. 6A, pull-up transistors Tu1, Tu2, Tu3, and Tu4 are connected to gate lines Gn, GLn+1, GLn+2, and GLn+3, respectively.

That is, the dummy stage DST can be implemented in a structure similar to the stage ST.

The stage ST and the dummy stage DST can be implemented in various types in addition to the structures illustrated in FIGS. 6A and 6B. However, features of the present disclosure may not be limited to the specific structure of the stage ST and the dummy stage DST. That is, a feature of the present disclosure is that dummy pull-up transistors DTu1, DTu2, DTu3, and DTu4 are all connected to the same dummy stage sensing line DSL, as illustrated in FIG. 6B. Accordingly, detailed descriptions of structures and functions of the stage ST and the dummy stage DST are omitted.

At least one dummy stage DST can be provided in the light emitting display panel 100.

For example, when the gate driver 200 is provided only on the left side of the non-display area NDA of the light emitting display panel 100, the dummy stage DST can be provided on the upper left side of the non-display area NDA, or on the lower left side of the non-display area NDA, or on each of the upper left side and the lower left side of the non-display area NDA. For example, the dummy stage DST can be provided in any of the four corners of the light emitting display panel 100, in the non-display area NDA.

Moreover, when stages ST configuring the gate driver are provided on the left and right sides of the non-display area NDA of the light emitting display panel 100, the dummy stage DST can be provided on the upper left, lower left, upper right, and lower right sides of the non-display area NDA of the light emitting display panel 100, as illustrated in FIG. 7.

Figure 8:
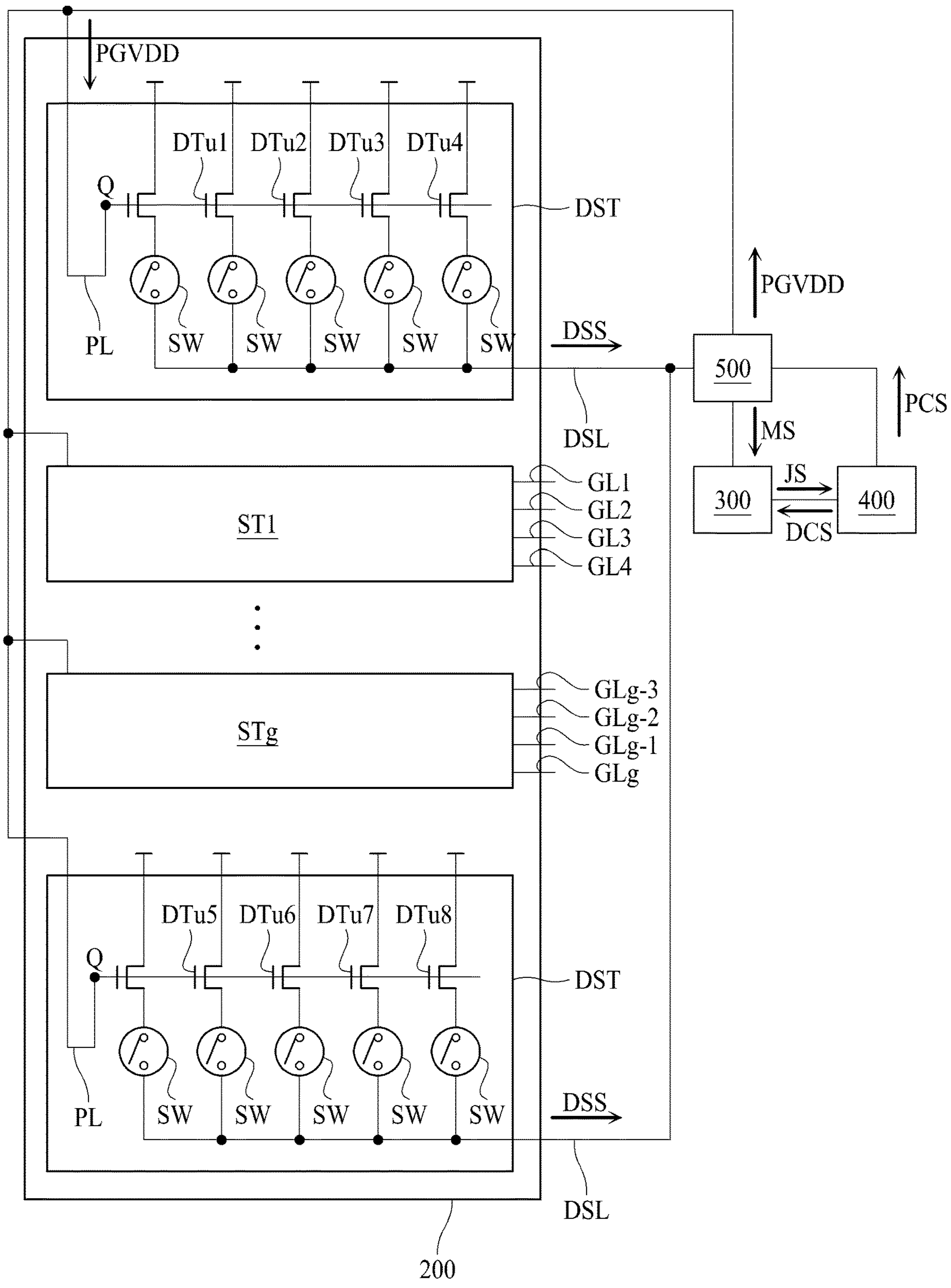
FIG. 8 is an example diagram illustrating a connection structure of a power supply and a dummy stage applied to a light emitting display apparatus according to an embodiment of the present disclosure.

FIG. 8 is an example diagram illustrating a connection structure of a power supply and a dummy stage applied to a light emitting display apparatus according to an embodiment of the present disclosure. The dummy stage DST illustrated in FIG. 8 can be the dummy stage DST illustrated in FIG. 6B. For convenience of description, in the dummy stage DST illustrated in FIG. 8, only the stage driving voltage line PL to which the stage driving voltage PGVDD is supplied, the dummy pull-up transistors DTu1, DTu2, DTu3, and DTu4, and the dummy stage sensing line DSL are illustrated.

As described above with reference to FIGS. 6A, 6B, and 7, at least one dummy stage DST can be provided in the gate driver 200.

The stage driving voltage PGVDD can be supplied not only to the dummy stage DST but also to the stages ST, as illustrated in FIG. 8. That is, the stages ST can output the gate pulses GP to the gate lines GL by using the stage driving voltage PGVDD.

The dummy pull-up transistors DTu1, DTu2, DTu3, and DTu4 can be connected to the dummy stage sensing line DSL in common. In other words, the dummy pull-up transistors DTu1, DTu2, DTu3, and DTu4 are all connected to the same dummy stage sensing line DSL.

When at least two dummy stages DST are provided in the light emitting display panel 100, dummy pull-up transistors Du1 to DTu8 provided in at least two dummy stages DST can be connected to the dummy stage sensing line DSL in common, as illustrated in FIG. 8. In other words, all the dummy pull-up transistors Du1 to DTu8 are all connected to the same dummy stage sensing line DSL. The dummy stage sensing line DSL can be connected to the power supply 500.

To provide an additional description, stages ST which output gate pulses GP can be provided in the gate driver 200, and a pull-up transistor Tu which is turned on by the stage driving voltage PGVDD to output the gate pulse is provided in each of the stages ST. A dummy pull-up transistor DTu corresponding to the pull-up transistor Tu can be provided in the dummy stage DST, and the dummy pull-up transistor DTu can be turned on by the stage driving voltage PGVDD. When the dummy pull-up transistor DTu is turned on, the dummy stage sensing signal DSS can be transmitted from the dummy pull-up transistor DTu to the power supply 500 through the dummy stage sensing line DSL.

Switches SW can be provided between the dummy pull-up transistors DTu1, DTu2, DTu3, and DTu4 and the dummy stage sensing line DSL, as illustrated in FIG. 8. For example, each dummy pull-up transistor can be connected to its own respective switch, which is connected between the corresponding dummy pull-up transistor and the dummy stage sensing line DSL.

During a dummy stage sensing period in which the characteristics of the dummy stage DST is sensed, the switches SW can connect the dummy pull-up transistors DTu1, DTu2, DTu3, and DTu4 to the dummy stage sensing line DSL based on control by the control driver 400. For example, the control driver 400 can selectively control the opening and the closing operations of the switches SW connected to the dummy pull-up transistors.

During a period (for example, a display period in which an image is output from the light emitting display panel) other than the dummy stage sensing period, the switches SW can be turned off based on control by the control driver 400, and thus, each of the dummy pull-up transistors DTu1, DTu2, DTu3, and DTu4 can be connected to the dummy gate line (DGL of FIG. 1). In this situation, the dummy stage DST can perform the same operation as the stage ST. That is, the dummy stage DST can output a dummy gate pulse to the dummy gate line DGL.

At least one of signals output from the dummy stage DST can be supplied to the stage ST to drive the stage ST.

For example, during the display period, the dummy stage DST can output a dummy gate pulse to at least one dummy gate line DGL provided in the non-display area NDA, and at least one of the signals output from the dummy stage DST can be supplied to the stage ST to drive the stage ST. Hereinafter, for convenience of description, a light emitting display apparatus without switches SW between the dummy pull-up transistors DTu1, DTu2, DTu3, and DTu4 and the dummy stage sensing line DSL will be described as an example of the present disclosure.

During the dummy stage sensing period, the stage driving voltage PGVDD generated in the power supply 500 can be supplied to the dummy stage DST and the stage ST, and the dummy stage sensing signal DSS (e.g., current or voltage) generated by the stage driving voltage PGVDD in the dummy pull-up transistor of the dummy stage is supplied to the power supply 500 again. For example, the stage driving voltage PGVDD can be fed back to the power supply 500 after passing through the dummy stage DST.

That is, the power supply 500 can supply the stage driving voltage PGVDD to the dummy stage DST, and can change a level of the stage driving voltage PGVDD by using the dummy stage sensing signal DSS transmitted from the dummy stage DST.

In this situation, the data driver 300 can generate a determination signal JS related to an occurrence of an abnormality in the gate driver, particularly, the dummy stage (DST), by using a monitoring signal MS transmitted from the power supply 500.

The control driver 400 can control the power supply 500 so that the power supply 500 changes a level of the stage driving voltage PGVDD based on a lookup table when it is determined that there is a problem in the gate driver, particularly, the dummy stage DST, as a result of analyzing the determination signal JS.

Information on the levels of the stage driving voltages GVDD based on the driving time of the gate driver 200 can be included in the lookup table stored in the storage unit 450.

In other words, as the device is in operation for a longer amount of time, the stage driving voltage PGVDD fed through the dummy stage DST and back to the power supply 500 can start to change or drift, and this change or drift can be monitored and the stage driving voltage PGVDD can be adjusted as needed. The adjustments can be stored in the lookup table ahead of time. For example, when the device is in operation for a short amount of time, the lookup table can be referenced for a minor adjustment to the stage driving voltage PGVDD, and when the device is in operation for a long time, the lookup table can be referenced for a larger adjustment to the stage driving voltage PGVDD, but embodiments are not limited thereto. Also, since the dummy stage DST has a similar circuit configuration as the stages ST, the dummy stage DST can serve as a good analog for estimating the degradation conditions of the transistors in the stages ST.

Figure 9:
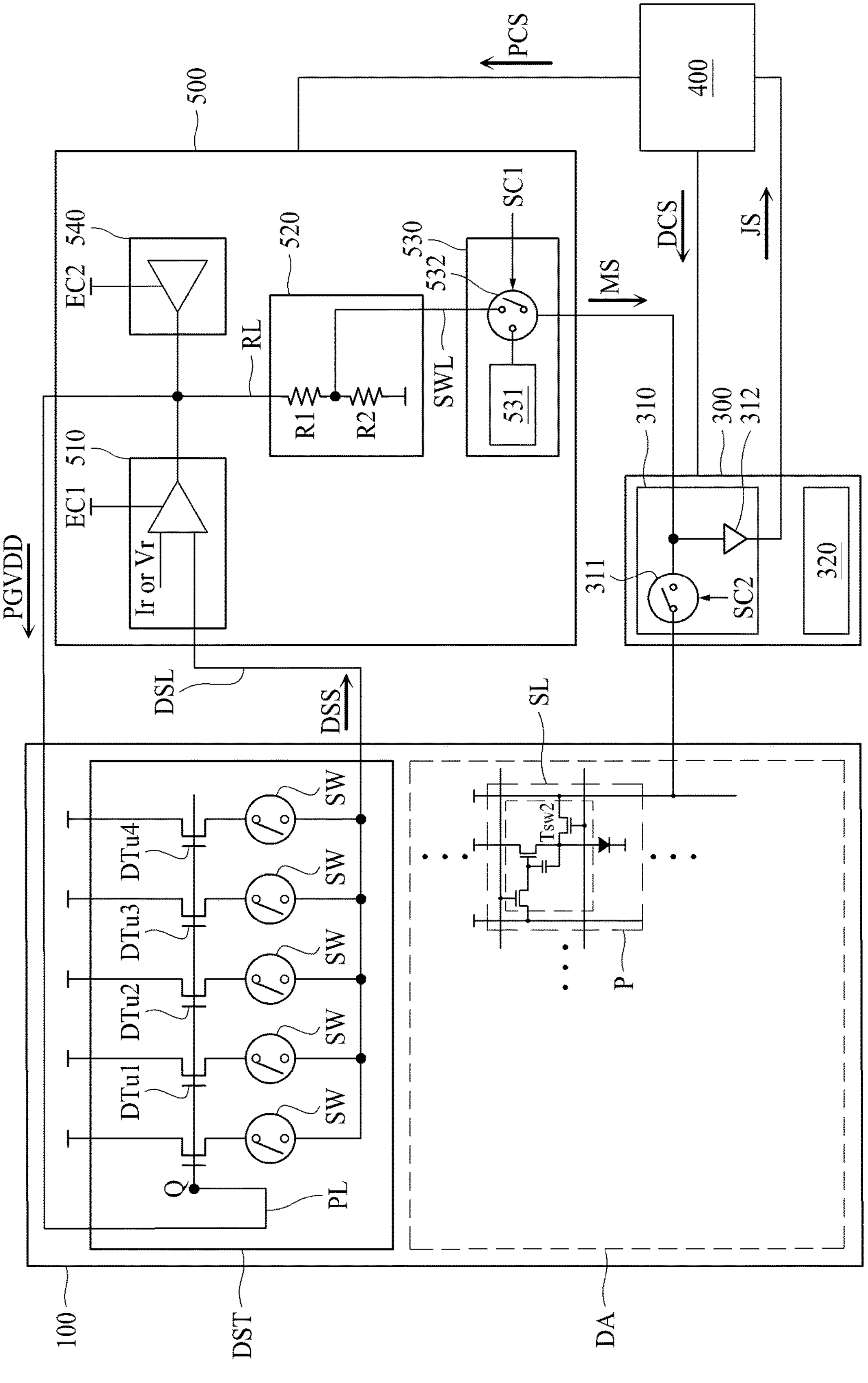
FIG. 9 is an example diagram illustrating a structure of a power supply and a data driver applied to a light emitting display apparatus according to an embodiment of the present disclosure.

FIG. 9 is an example diagram illustrating a structure of a power supply and a data driver applied to a light emitting display apparatus according to an embodiment of the present disclosure. In the following description, details which are the same or similar to details described above with reference to FIGS. 1 to 8 are omitted or will be briefly described.

The gate driver 200 can include stages ST which output gate pulses GP to the gate lines GL provided in the light emitting display panel 100 by using the stage driving voltage PGVDD and at least one dummy stage DST which generates a dummy stage sensing signal DSS by using the stage driving voltage PGVDD. The dummy stage DST illustrated in FIG. 9 is schematically illustrated like the dummy stage DST illustrated in FIG. 8.

Pixels P can be provided in the display area DA of the light emitting display panel 100 provided with the gate driver 200.

The power supply 500 can include a feedback voltage supply 510, a conversion unit 520, a selection unit 530, and an auxiliary voltage supply 540, as illustrated in FIG. 9.

The feedback voltage supply 510 can supply the stage driving voltage PGVDD to the gate driver (200), for example, the stage ST and the dummy stage DST, and can change the level of the stage driving voltage PGVDD by using the dummy stage sensing signal DSS.

For example, the feedback voltage supply 510 can compare the dummy stage sensing signal DSS with a determination reference current Ir or a determination reference voltage Vr to determine whether the current or voltage value of the dummy stage sensing signal DSS is within a predetermined range.

As a result of the determination, when the current value or voltage value of the dummy stage sensing signal DSS is within a predetermined range, the feedback voltage supply 510 may not change the level of the stage driving voltage PGVDD supplied to the stage ST and the dummy stage DST (e.g., the level of the stage driving voltage PGVDD can be maintained at the current level).

As another result of the determination, when the current value or voltage value of the dummy stage sensing signal DSS is out of the predetermined range, for example, when the current value or voltage value is less than a predetermined level, the feedback voltage supply 510 can increase the level of the stage driving voltage PGVDD so that the current value or voltage value is within the predetermined range. In this way, any changes due to prolonged used of the device can be compensated and normal operations can be maintained even over a long period of operation.

That is, when the light emitting display apparatus is used for a long time, the pull-up transistor Tu and the dummy pull-up transistor DTu can become degraded. When the pull-up transistor Tu and the dummy pull-up transistor DTu are degraded, the current or voltage value of the gate pulse GP output through the pull-up transistor Tu can decrease, and the current or voltage value of the dummy stage sensing signal DSS output through the dummy pull-up transistor DTu can decrease.

When a current value or a voltage value of the gate pulse GP is reduced, the luminance of the pixel P can be less than a predetermined luminance, which can impair image quality and be noticeable to a viewer.

Therefore, in order to change the luminance of the pixel P back to a predetermined level to provide the proper amount of luminance (e.g., the predetermined luminance), the level of the stage driving voltage PGVDD supplied to the gate of the pull-up transistor Tu should be increased. In other words, if the pull-up transistors Tu and the dummy pull-up transistors DTu become degraded, then the power can be boosted in order to compensate.

To this end, in the light emitting display apparatus according to the present disclosure, the level of the stage driving voltage PGVDD can be changed by using the dummy stage sensing signal DSS.

The reason that this method is possible is because the degree of degradation of the dummy pull-up transistor DTu is similar to the degree of degradation of the pull-up transistor Tu. In other words, the dummy pull-up transistor DTu is similar to a “canary in a coal mine” and can be used as a proxy or analog to evaluate the state of the other transistors in the stages ST.

Because the dummy pull-up transistor DTu is also driven when the pull-up transistor Tu is driven, the degree of degradation of the dummy pull-up transistor Dtu can be similar to the degree of degradation of the pull-up transistor Tu.

For example, as described with reference to FIG. 8, when the switches SW are turned off during the display period, each of the dummy pull-up transistors Dtu1, Dtu2, Dtu3, and Dtu4 can be connected to the dummy gate line DGL. In this situation, the dummy stage DST can perform the same operation as the stage ST. That is, the dummy stage DST can output a dummy gate pulse to the dummy gate line DGL.

Furthermore, the structure and function of the dummy stage DST are similar to the structure and function of the stage DST. Therefore, even when the dummy pull-up transistors Dtu1, Dtu2, Dtu3, and Dtu4 are connected to the dummy stage sensing line DSL, in the display period, each of the dummy pull-up transistors Dtu1, Dtu2, Dtu3, and Dtu4 can be sequentially turned on by gate clocks SCCLK(n), SCCLK(n+1), SCCLK(n+2), and SCCLK(n+3) to sequentially supply the dummy stage sensing signal DSS to the power supply 500. That is, the dummy pull-up transistor Dtu can repeat turn-on and turn-off operations in the same manner as the pull-up transistor Tu in the stages ST. In this situation, the power supply 500 can perform a sensing operation or may not perform a sensing operation.

For example, the power supply 500 may not perform a sensing operation during the display period. In this situation, the dummy stage sensing signals DSS are not analyzed by the power supply 500.

However, the power supply 500 can perform a sensing operation during the display period to change the level of the stage driving voltage PGVDD supplied to the dummy stage DST and the stage ST based on the dummy stage sensing signal DSS.

As described above, the dummy pull-up transistor DTu can repeat the turn-on and turn-off operations in the same manner as the pull-up transistor Tu during the display period. Accordingly, the degree of degradation of the dummy pull-up transistor DTu can be the same as or similar to the degree of degradation of the pull-up transistor Tu.

Therefore, in the light emitting display apparatus according to the present disclosure, the degree of degradation of the pull-up transistor Tu can be predicted by using the dummy stage sensing signal DSS received from the dummy stage DST, and thus, the level of the stage driving voltage PGVDD can be changed or adjusted to compensate for any degradation.

That is, in the light emitting display apparatus according to the present disclosure, the level of the stage driving voltage PGVDD to be used in the stage ST can be changed based on the dummy stage sensing signal DSS.

In this situation, a voltage supplied to the dummy stage DST is also the driving voltage PGVDD output from the feedback voltage supply 510, and the dummy stage sensing signal DSS generated from the dummy stage DST is transmitted to the feedback voltage supply 510.

The conversion unit 520 can convert the stage driving voltage PGVDD output from the feedback voltage supply 510 into the monitoring signal MS.

That is, the conversion unit 520 can generate the monitoring signal MS by reducing the level of the stage driving voltage PGVDD output from the feedback voltage supply 510.

To this end, the conversion unit 520 can include at least two resistors R1 and R2 (e.g., a voltage divider circuit) connected to the resistance line RL connected to the feedback voltage supply 510 as illustrated in FIG. 9. A switching line SWL connected to the selection unit 530 can be connected to the resistance line RL.

In the resistance line RL where at least two resistors R1 and R2 are connected, the level of the monitoring signal MS supplied to the selection unit 530 through the resistance line RL can vary based on the position where the switching line SWL is connected.

For example, the level of the stage driving voltage PGVDD can be outside the voltage range available to the data driver 300. In this situation, the conversion unit 520 can reduce the level of the stage driving voltage PGVDD to generate the monitoring signal MS having a level which is used in the data driver 300.

To this end, the switching line SWL can be connected to a specific position between the resistors R1 and R2 connected to the resistance line RL. Here, the specific position can be a position which can reduce a level of the stage driving voltage PGVDD to a level which can be used by the data driver 300.

The selection unit 530 can transmit the monitoring signal MS or the reference voltage Vref to the data driver 300.

To this end, the selection unit 530 can include a selection switch 532 which can connect one of a reference voltage generator 531, which generates the reference voltage Vref, and the switching line SWL to the data driver 300.

That is, the selection unit 530 can connect one of the reference voltage generator 531 and the switching line SWL to the data driver 300 based on a first switch control signal SC1 transmitted from the control driver 400. The first switch control signal SC1 can be included in the power control signals PCS.

The auxiliary voltage supply 540 can change the level of the stage driving voltage PGVDD based on the lookup table and transmit the stage driving voltage PGVDD to the gate driver 200.

The data driver 300 can include a data voltage supply 320 and a determination signal generator 310.

The data voltage supply 320 can generate data voltages Vdata to be supplied to the data lines DL provided in the light emitting display panel 100 during the display period when the image is output from the light emitting display panel 100. That is, light can be output from the pixels P by the data voltages Vdata generated by the data voltage supply 320.

The determination signal generator 310 can supply the reference voltage Vref to pixels P provided in the light emitting display panel or convert the monitoring signal MS transmitted from the power supply 500 into a digital signal to generate a determination signal JS. The determination signal generator 310 can transmit the determination signal JS to the control driver 400.

To this end, the determination signal generator 310 can include an analog digital converter 312, which converts the monitoring signal MS into the digital signal to generate the determination signal JS, and a switching unit 311, which supplies the reference voltage Vref to the pixels P and supplies the monitoring signal MS to the analog digital converter 312.

The switching unit 311 can transmit the monitoring signal MS to the analog digital converter 312, or can supply the reference voltage Vref to the pixel P, based on a second switch control signal SC2 transmitted from the control driver 400.

The second switch control signal SC2 is included in the data control signals DCS from the control driver 400.

Finally, as a result of the determination using the determination signal JS, when it is determined that there is no problem in the gate driver 200 (e.g., the gate driver 200 is currently operating normally), the control driver 400 can drive the feedback voltage supply 510 and may not drive the auxiliary voltage supply 540.

For example, when the dummy stage DST is operating normally, the level of the voltage value or current value analyzed by using the determination signal JS can be included within the normal range.

In this situation, the control driver 400 can transmit a first enable signal EC1 for driving the feedback voltage supply 510 to the feedback voltage supply 510 and transmit a second enable signal EC2 to the auxiliary voltage supply 540 for preventing the auxiliary voltage supply 540 from being driven. The first enable signal EC1 and the second enable signal EC2 can be included in the power control signals PCS from the control driver 400.

Accordingly, the feedback voltage supply 510 can change a level of the stage driving voltage PGVDD based on the dummy stage sensing signal DSS.

However, as a result of the determination using the determination signal JS, when it is determined that a problem has occurred in the gate driver 200, particularly, the dummy stage DST, the control driver 400 may not drive the feedback voltage supply 510, but drives the auxiliary voltage supply 540 instead.

For example, when a circuit is shorted in the dummy stage DST, or a circuit is opened in the dummy stage DST, or various defects preventing the dummy stage DST from operating normally, the level of the voltage value or current value analyzed by using the determination signal JS can be out of the normal range. Here, the normal range means a range determined that a defect such as short or open is not present in the dummy stage DST.

That is, a level of the voltage value or current value analyzed by using the determination signal JS is out of the normal range means that the dummy stage DST is not operating normally. In this situation, the feedback voltage supply 510 can change a level of the stage driving voltage PGVDD based on the wrong analysis result.

Therefore, the control driver 400 can transmit the first enable signal EC1, which prevents the feedback voltage supply 510 from being driven, to the feedback voltage supply 510, and can transmit the second enable signal EC2 for driving the auxiliary voltage supply 540 to the auxiliary voltage supply 540.

Accordingly, the auxiliary voltage supply 540 can change a level of the stage driving voltage PGVDD by using the lookup table.

Information on the levels of the stage driving voltages GVDD based on the driving time of the gate driver 200 can be included in the lookup table stored in the storage unit 450. The driving time of the gate driver 200 can be the same as or similar to the driving time of the light emitting display apparatus.

When the light emitting display apparatus is used for a long time, as described above, the pull-up transistor Tu provided in the stage ST can become degraded, and thus, the normal gate pulse GP cannot be output from the pull-up transistor Tu. Therefore, the stage driving voltage PGVDD capable of correcting the degradation of the pull-up transistor Tu should be supplied to the stage ST.

In this situation, the degree of degradation of the pull-up transistor Tu can increase in proportion to the time during which the light emitting display apparatus was used.

Therefore, the lookup table can include the time during which the light emitting display apparatus was used and a level of the stage driving voltage PGVDD corresponding to the time.

For example, the lookup table can include a level of the stage driving voltage PGVDD to be supplied when the light emitting display apparatus was used for 100 hours, a level of the stage driving voltage PGVDD to be supplied when the light emitting display apparatus was used for 500 hours, and a level of the stage driving voltage PGVDD to be supplied when the light emitting display apparatus was used for 1000 hours.

The lookup table can be stored in the storage unit 450 after being set by testing the light emitting display apparatus during the manufacturing process of the light emitting display apparatus.

To provide an additional description, in the light emitting display apparatus according to the present disclosure, when the dummy stage DST is driven normally, the stage driving voltage PGVDD can be changed by the feedback voltage supply 510 based on the real degradation of the dummy pull-up transistor DTu and the pull-up transistor Tu.

However, when it is determined that the dummy stage DST is being driven abnormally, the stage driving voltage PGVDD can be changed by the auxiliary voltage supply 540 based on the lookup table.

Figure 10A:
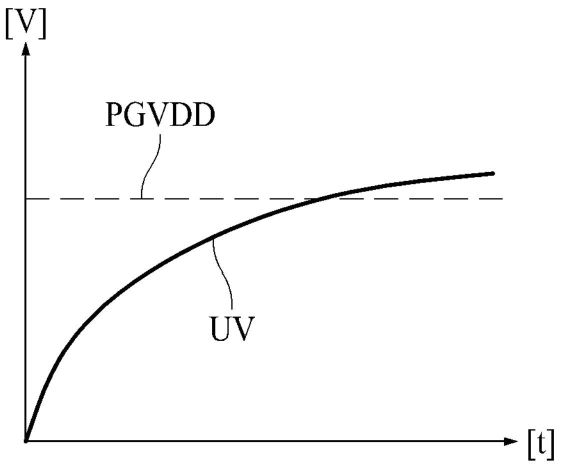
FIG. 10A is an example graph illustrating a stage driving voltage generated in a light emitting display apparatus of the related art as a comparative example.
Figure 10B:
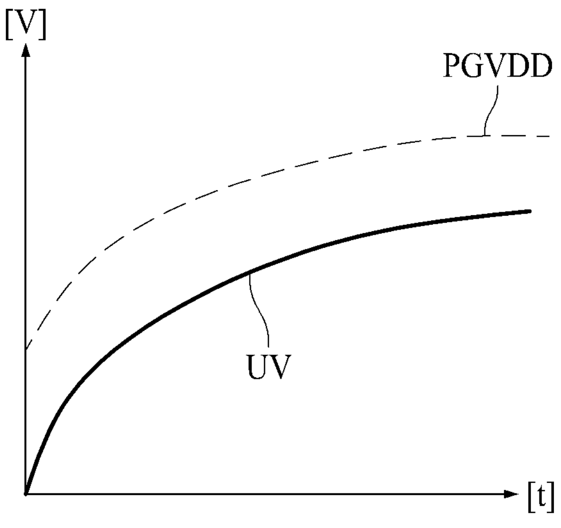
FIG. 10B is an example graph illustrating a stage driving voltage generated in a light emitting display apparatus according to an embodiment of the present disclosure.

FIG. 10A is an example graph illustrating a stage driving voltage generated in a light emitting display apparatus of the related art as a comparative example, and FIG. 10B is an example graph illustrating a stage driving voltage generated in a light emitting display apparatus according to an embodiment of the present disclosure. In FIGS. 10A and 10B, the abscissa axis represents a use time (t) of the light emitting display apparatus, and the ordinate axis represents a voltage (V) used in the light emitting display apparatus. In the following descriptions, details which are the same as or similar to details described with reference to FIGS. 1 to 9 are omitted or briefly described.

When a light emitting display apparatus is used, the pull-up transistors Tu in the stage ST and the dummy pull-up transistors DTu in the dummy stage DST are slowly degraded under the same conditions.

That is, as described above, the stage ST and the dummy stage DST can both be driven in the same method during the display period during which an image is output.

Accordingly, the magnitude of the stress which the pull-up transistors Tu are subjected to and the magnitude of the stress which the dummy pull-up transistors DTu are subjected to are the same or similar. Accordingly, the degree of degradation of the pull-up transistors Tu can be the same or similar to the degree of degradation of the dummy pull-up transistor DTu.

A sensing operation which generates a dummy stage sensing signal DSS can be performed after a predetermined period (for example, 1000 hours, 2000 hours, 5000 hours, etc.) elapses, or when the use of a light emitting display apparatus begins or ends (e.g., at power on or when powering off the device). Also, according to an embodiment, the sensing operation can be performed in response to a user command.

In this situation, the sensing operation can be performed every predetermined period (e.g., 1 hour, a day, a week, a month, etc.).

The sensing operation can be performed during a period when the image is not output. For example, the sensing operation can be performed while the light emitting display apparatus is turned on to prepare for image output, or while the light emitting display is operated for threshold voltage sensing after the light emitting display apparatus is turned off.

Moreover, the sensing operation can be performed during a display period during which an image is output. For example, while the stages ST are driven, a dummy stage sensing signal DSS can be generated from the dummy stage DST.

Furthermore, the sensing operation can be performed during a period in which the image is not output, e.g., a blank period, between the display periods in which the image is output.

When the dummy stage sensing period begins in any of the various periods as described above, the feedback voltage supply 510 can supply the stage driving voltage PGVDD to the dummy stage DST.

When the stage driving voltage PGVDD is supplied to the dummy stage DST and a start signal for driving the dummy stage DST is supplied to the dummy stage DST, the stage driving voltage PGVDD can be supplied to the dummy pull-up transistor DTu. Accordingly, a current can flow through the dummy pull-up transistor DTu. The current can be supplied to the feedback voltage supply 510 through the dummy stage sensing line DSL.

The current or voltage flowing to the feedback voltage supply 510 can be the dummy stage sensing signal DSS.

The feedback voltage supply 510 can compare the dummy stage sensing signal DSS with the determination reference current Ir or the determination reference voltage Vr to determine whether the current or voltage value of the dummy stage sensing signal DSS is within a predetermined range. For example, as a result of comparing the dummy stage sensing signal DSS with the determination reference current Ir or the determination reference voltage Vr, when the difference value is within a predetermined difference value range, the feedback voltage supply 510 can determine that a current value or a voltage value of the dummy stage sensing signal DSS is included in a predetermined range.

As a result of the determination, when the current value or voltage value of the dummy stage sensing signal DSS is within a predetermined range, the feedback voltage supply 510 may not change the level of the stage driving voltage PGVDD supplied to the stage ST and the dummy stage DST (e.g., the current level of the stage driving voltage PGVDD can be maintained the same while the dummy stage DST is operating normally or within the predetermined range).

As a result of the determination, when the current value or voltage value of the dummy stage sensing signal DSS is outside of the predetermined range, e.g., when the current value or voltage value is less than a predetermined level, the feedback voltage supply 510 can increase the level of the stage driving voltage PGVDD so that the current value or voltage value stays or returns to within the predetermined range.

The increased stage driving voltage PGVDD can be supplied to the stages ST during the display period. Therefore, the pull-up transistor Tu of the stage ST can be driven by the increased stage driving voltage PGVDD, and thus, normal gate pulses GP can continue to be output from the stage ST and good image quality can be maintained even when the device has been operated for a long amount of time.

Therefore, in the light emitting display apparatus according to the present disclosure, as illustrated in FIG. 10B, the stage driving voltage PGVDD can be increased in proportion to a voltage UV required to drive the pull-up transistor Tu (hereinafter simply referred to as a need voltage).

That is, in order to ensure that the stage ST can be operated stably, a voltage slightly larger than the need voltage UV can be used as the stage driving voltage PGVDD supplied to the stage ST. In this situation, when the pull-up transistor Tu is degraded, the need voltage UV of the stage ST should increase, and thus, the stage driving voltage PGVDD should also increase.

Therefore, in the light emitting display apparatus according to the present disclosure, the stage driving voltage PGVDD can gradually increase as illustrated in FIG. 10B by the sensing operation as described above.

However, in the light emitting display apparatus of the related art, as illustrated in the comparative example of FIG. 10A, the stage driving voltage PGVDD is fixed at a constant value. For example, the stage driving voltage PGVDD is set to a voltage greater than a need voltage UV which is finally needed when the transistors of the light emitting display apparatus are degraded.

Therefore, during the initial operation of the light emitting display apparatus of the related art, the difference between the stage driving voltage PGVDD and the need voltage UV is large. Accordingly, the pull-up transistor Tu is under great stress and power is wasted. Because the stress of the pull-up transistor Tu continues to accumulate, the stress of the pull-up transistor Tu increases as the amount of time the light emitting display apparatus of the related art is used increases. Accordingly, the quality of the stage ST including the pull-up transistor Tu can be gradually degraded.

However, according to the light emitting display apparatus according to the present disclosure, as described above, the stage driving voltage PGVDD can gradually increase as the need voltage UV increases.

Therefore, even during the initial operation of the light emitting display apparatus, the difference between the stage driving voltage PGVDD and the need voltage UV is not large and the stress on the pull-up transistor Tu can be minimized. Accordingly, the stress of the pull-up transistor Tu is not large. Therefore, the quality of the stage ST including the pull-up transistor Tu can be maintained for a long time and the lifespan of the stage ST including the pull-up transistor Tu can be extended and power consumption can be reduced while still providing good image quality.

Moreover, in the light emitting display apparatus of the related art, a need voltage greater than the maximum need voltage UV expected when manufacturing the light emitting display apparatus can be required. Therefore, in the light emitting display apparatus of the related art, a stage driving voltage PGVDD smaller than the need voltage UV can be supplied to the stage ST, and thus, the stage ST may not be driven normally.

However, in the light emitting display apparatus according to the present disclosure, the stage driving voltage PGVDD can dynamically increase based on the degree of degradation of the pull-up transistor Tu, and thus, the stage can be continuously driven normally and the lifespan of the light emitting display apparatus can be extended.

Moreover, during the initial operation of the light emitting display apparatus of the related art, as illustrated in FIG. 10A, a stage driving voltage PGVDD much greater than the need voltage UV is supplied to the stage. Therefore, the power consumption of the light emitting display apparatus is large.

However, during the initial operation of the light emitting display apparatus according to the present disclosure, as illustrated in FIG. 10B, the difference between the need voltage UV and the stage driving voltage PGVDD is not large. Accordingly, the power consumption of the light emitting display apparatus according to the present disclosure can be reduced compared to the related art.

Moreover, because the power consumption is accumulated, even when the light emitting display apparatus is used for a long time, the total power consumption of the light emitting display apparatus according to the present disclosure can be reduced when compared to the total power consumption of the light emitting display apparatus of the related art.

As described above, according to the present disclosure, the stage driving voltage PGVDD can be dynamically changed based on the degree to which the pull-up transistor Tu is really degraded, and thus, the power consumption of the light emitting display apparatus can be reduced when compared to the related art.

The conversion unit 520 can convert the stage driving voltage PGVDD output from the feedback voltage supply 510 into the monitoring signal MS.

The selection unit 530 can transmit the monitoring signal MS to the data driver 300. That is, the selection unit 530 can connect the switching line SWL to the data driver 300 based on the first switch control signal SC1, and thus, the monitoring signal MS can be transmitted to the data driver 300.

The determination signal generator 310 of the data driver 300 can convert the monitoring signal MS into a digital signal to generate the determination signal JS. The determination signal generator 310 can transmit the determination signal JS to the control driver 400.

To this end, the switching unit 311 can transmit the monitoring signal MS to the analog digital converter 312 based on the second switch control signal SC2 transmitted from the control driver 400.

Finally, as a result of the determination using the determination signal JS, when it is determined that there is no problem in the gate driver 200, the control driver 400 can transmit the first enable signal EC1 to the feedback voltage supply 510 so that the feedback voltage supply 510 is driven, and transmit the second enable signal EC2 to the auxiliary voltage supply 540 so that the auxiliary voltage supply 540 is not driven.

Accordingly, the feedback voltage supply 510 can increase the level of the stage driving voltage PGVDD, as described with reference to FIG. 10B.

However, as a result of the determination using the determination signal JS, when it is determined that there is a problem in the dummy stage DST, the control driver 400 can transmit the first enable signal EC1 to the feedback voltage supply 510 so that the feedback voltage supply 510 is not driven (e.g., the feedback voltage supply 510 is turned off), and transmit the second enable signal EC2 to the auxiliary voltage supply 540 so that the auxiliary voltage supply 540 is driven (e.g., the auxiliary voltage supply 540 is turned on).

Accordingly, the auxiliary voltage supply 540 can change the level of the stage driving voltage PGVDD by using the lookup table.

That is, the feedback voltage supply 510 can increase the stage driving voltage PGVDD by using the information substantially analyzed by the dummy stage sensing signal DSS.

However, the auxiliary voltage supply 540 can increase the stage driving voltage PGVDD by using the lookup table stored in the storage unit 450 after being set by testing the light emitting displays apparatus during the manufacturing process of the light emitting display apparatuses.

The auxiliary voltage supply 540 can also gradually increase the level of the stage driving voltage PGVDD, as illustrated in FIG. 10B, based on the amount of time the light emitting display apparatus is used by referencing the lookup table.

Therefore, the effect of the present disclosure described with reference to FIGS. 10A and 10B can be applied equally even when the level of the stage driving voltage PGVDD is changed by using the auxiliary voltage supply 540.

According to one embodiment of the present disclosure, an optimal stage driving voltage can be supplied to the gate driver even while the light emitting display apparatus is used by the user for a large amount of usage. Accordingly, the gate driver can be continuously and normally driven, and the lifespan of the light emitting display apparatus can be extended.

Moreover, according to one embodiment of the present disclosure, the level of the stage driving voltage can be sequentially increased based on the degree of degradation of the transistors provided in the gate driver. Accordingly, the power consumption of the light emitting display apparatus can increase sequentially, and thus, the power consumption of the light emitting display apparatus according to an embodiment of the present disclosure can be reduced in comparison to the power consumption of the light emitting display apparatus of the related art.

That is, according to the present disclosure, a low-power light emitting display apparatus with a longer lifespan and improved image quality can be provided.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:

a panel including a gate driver circuit outputting gate pulses and pixels displaying an image;

a power supply circuit supplying a stage driving voltage to the gate driver circuit and adjust a level of the stage driving voltage based on a dummy stage sensing signal received from the gate driver circuit;

a data driver circuit supplying data voltages to the pixels and generate a determination signal related to an occurrence of an abnormality in the gate driver circuit based on a monitoring signal received from the power supply circuit; and a control driver circuit receiving the determination signal from the data driver circuit and control the power supply circuit to adjust the level of the stage driving voltage based on a lookup table, wherein the data driver circuit converts the monitoring signal received from the power supply circuit into a digital signal to generate the determination signal and transmits the determination signal to the control driver circuit.

2. The light emitting display apparatus of claim 1, wherein the gate driver circuit includes:

stages outputting gate pulses to gate lines in the panel by using the stage driving voltage supplied by the power supply circuit; and at least one dummy stage generating the dummy stage sensing signal based on the stage driving voltage supplied by the power supply circuit.

3. The light emitting display apparatus of claim 2, wherein the at least one dummy stage includes a first dummy stage and a second dummy stage, and wherein the stages are disposed between the first dummy stage and the second dummy stage.

4. The light emitting display apparatus of claim 1, wherein the power supply circuit includes:

a feedback voltage supply circuit supplying the stage driving voltage to the gate driver circuit and adjust the level of the stage driving voltage based on the dummy stage sensing signal;

a converter circuit converting the stage driving voltage output from the feedback voltage supply into the monitoring signal;

a selector circuit selectively transmitting the monitoring signal to the data driver circuit or a reference voltage to the data driver circuit; and an auxiliary voltage supply circuit adjusting the level of the stage driving voltage based on the lookup table to generate an adjusted stage driving voltage and supply the adjusted stage driving voltage to the gate driver circuit.

5. The light emitting display apparatus of claim 4, wherein when the determination signal indicates that the gate driver circuit is operating normally, the control driver circuit drives the feedback voltage supply circuit and does not drive the auxiliary voltage supply circuit, and when the determination signal indicates that the gate driver circuit is operating abnormally, the control driver circuit drives the auxiliary voltage supply circuit and not drive the feedback voltage supply circuit.

6. The light emitting display apparatus of claim 4, wherein the monitoring signal is generated by reducing a level of the stage driving voltage output from the feedback voltage supply circuit.

7. The light emitting display apparatus of claim 6, wherein the power supply circuit includes a voltage divider circuit generating the monitoring signal.

8. The light emitting display apparatus of claim 1, wherein the data driver circuit comprises:

a data voltage supply circuit generating data voltages to be supplied to data lines in the panel; and a determination signal generator circuit supplying a reference voltage to pixels in the light emitting display panel or convert the monitoring signal.

9. The light emitting display apparatus of claim 8, wherein the determination signal generator circuit includes:

an analog digital converter circuit converting the monitoring signal into a digital signal to generate the determination signal; and a switching part circuit supplying the reference voltage to the pixels and supply the monitoring signal to the analog digital converter circuit.

10. The light emitting display apparatus of claim 1, wherein the stage driving voltage is supplied to at least one dummy stage provided in the gate driver circuit, and the dummy stage sensing signal generated by the stage driving voltage is transmitted from the at least one dummy stage to the power supply circuit.

11. The light emitting display apparatus of claim 10, wherein the gate driver circuit includes stages outputting the gate pulses and each of the stages includes a pull-up transistor that is turned on by the stage driving voltage to output the gate pulses, and the at least one dummy stage includes a dummy pull-up transistor corresponding to the pull-up transistor in each of the stages, the dummy pull-up transistor is turned on by the stage driving voltage and transmit the dummy stage sensing signal to the power supply circuit.

12. The light emitting display apparatus of claim 10, wherein the level of the stage driving voltage is adjusted based on the lookup table when a circuit is shorted or a circuit is opened in the at least one dummy stage.

13. The light emitting display apparatus of claim 1, wherein information on a plurality of levels of the stage driving voltage is included in the lookup table and the plurality of levels of the stage driving voltage correspond to different driving times of the gate driver circuit.

14. The light emitting display apparatus of claim 1, wherein the gate driver circuit includes at least one dummy stage, and wherein the at least one dummy stage includes a plurality of dummy pull-up transistors and all of the plurality of dummy pull-up transistors are connected to a same dummy stage sensing line.

15. The light emitting display apparatus of claim 1, wherein the level of the stage driving voltage is dynamically adjusted higher by the power supply circuit as an operating time of the gate driver circuit increases.

16. A light emitting display apparatus comprising:

a power supply supplying a stage driving voltage;

a gate driver outputting gate pulses to a plurality of pixels based on the stage driving voltage; and at least one dummy stage outputting a dummy stage sensing signal to the power supply, the at least one dummy stage being included in the gate driver, wherein the dummy stage sensing signal is based on feeding back the stage driving voltage to the power supply after the stage driving voltage passes through the at least one dummy stage, wherein the power supply adjusts a level of the stage driving voltage based on the dummy stage sensing signal, wherein the at least one dummy stage includes a plurality of dummy pull-up transistors and all of the plurality of dummy pull-up transistors are connected to a same dummy stage sensing line, and wherein the dummy sensing line is connected to the power supply.

17. The light emitting display apparatus of claim 16, wherein the power supply is further configured to:

compare the dummy stage sensing signal to a predetermined range, in response to the dummy stage sensing signal being within the predetermined range, maintain the level of the stage driving voltage and continue to output the level of the stage driving voltage to the gate driver, and in response to the dummy stage sensing signal being outside of the predetermined range, adjust the level of the stage driving voltage to generate an adjusted stage driving voltage and output the adjusted stage driving voltage to the gate driver.

18. The light emitting display apparatus of claim 16, wherein the gate driver includes a plurality of stages configured to output the gate pulses to the plurality of pixels, wherein the at least one dummy stage includes a first dummy stage and a second dummy stage, and wherein the plurality of stages are disposed between the first dummy stage and the second dummy stage.

19. The light emitting display apparatus of claim 16, wherein the power supply is further configured to adjust the level of the stage driving voltage based on a lookup table.

20. The light emitting display apparatus of claim 16, wherein the power supply is further configured to dynamically adjust the level of the stage driving voltage in a non-linear manner as an operating time of the gate driver becomes longer.

* * * * *